US 11,057,942 B2

(12) United States Patent
Zhao et al.

(10) Patent No.: US 11,057,942 B2
(45) Date of Patent: Jul. 6, 2021

(54) DATA TRANSMISSION METHOD FOR MULTIPLEXING DATA PORTION, DEVICE, AND SYSTEM

(71) Applicant: CHINA ACADEMY OF TELECOMMUNICATIONS TECHNOLOGY, Beijing (CN)

(72) Inventors: Zheng Zhao, Beijing (CN); Ekpenyong Tony, Beijing (CN); Bin Ren, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/476,115

(22) PCT Filed: Feb. 6, 2018

(86) PCT No.: PCT/CN2018/075486
§ 371 (c)(1),
(2) Date: Jul. 5, 2019

(87) PCT Pub. No.: WO2018/127223
PCT Pub. Date: Jul. 12, 2018

(65) Prior Publication Data
US 2019/0357268 A1 Nov. 21, 2019

(30) Foreign Application Priority Data

Jan. 6, 2017 (CN) .......................... 201710011307.5

(51) Int. Cl.
*H04W 74/08* (2009.01)
*H04L 5/00* (2006.01)
*H04L 5/10* (2006.01)

(52) U.S. Cl.
CPC ....... *H04W 74/0833* (2013.01); *H04L 5/0016* (2013.01); *H04L 5/0051* (2013.01); *H04L 5/10* (2013.01)

(58) Field of Classification Search
None
See application file for complete search history.

(56) References Cited

U.S. PATENT DOCUMENTS 9,848,415 B2 * 12/2017 Skov ................. H04W 56/0005
2010/0238831 A1 * 9/2010 Jeong ................. H04W 52/267
370/252

(Continued)

FOREIGN PATENT DOCUMENTS

| CN | 103747534 A | 4/2014 |
| CN | 105636207 A | 6/2016 |
| WO | 2014/146300 A1 | 9/2014 |

*Primary Examiner* — Anh Ngoc M Nguyen
(74) *Attorney, Agent, or Firm* — Kilpatrick Townsend & Stockton, LLP

(57) ABSTRACT

Disclosed are a data transmission method, device, and system. The method comprises: for the transmission of random access uplink data, according to the correspondence between preambles and data resources as described by a protocol, determining the data resource corresponding to the preamble in the uplink data transmission, different preambles corresponding to different data resources; transmitting the preamble and the uplink data that uses the determined data resource. In the embodiments of the present invention, a protocol describes the correspondence between preambles and data resources. For the transmission of random access uplink data, the data resource corresponding to the preamble in the uplink data transmission can be determined, and different preambles correspond to different data resources. Thus it can be ensured that different users use different data resources to bear uplink data, thereby enabling the data portion multiplexing for multiple users.

14 Claims, 5 Drawing Sheets

(56) References Cited

U.S. PATENT DOCUMENTS

| | | | |
|---|---|---|---|
| 2011/0111784 A1* | 5/2011 | Seo | H04W 72/0413 |
| | | | 455/509 |
| 2011/0216722 A1* | 9/2011 | Yang | H04W 12/0602 |
| | | | 370/329 |
| 2015/0117410 A1* | 4/2015 | Wu | H04W 36/0069 |
| | | | 370/331 |
| 2017/0006640 A1 | 1/2017 | Dinan | |
| 2017/0164411 A1* | 6/2017 | Choi | H04W 74/0833 |

* cited by examiner

… …

DATA TRANSMISSION METHOD FOR MULTIPLEXING DATA PORTION, DEVICE, AND SYSTEM

This application is a National Stage of International Application No. PCT/CN2018/075486, filed Feb. 6, 2018, which claims the benefit of Chinese Patent Application No. 201710011307.5, filed with the Chinese Patent Office on Jan. 6, 2017, and entitled "A data transmitting method, device, and system", both of which are hereby incorporated by reference in their entireties.

FIELD

The present invention relates to the field of communications, and particularly to a data transmitting method, device, and system.

BACKGROUND

As the wireless communication technologies are advancing rapidly, User Equipments (UEs) have widespread in our society, and as the UEs are being popularized, they have become an indispensable type of electronic product in our life. At present, the UEs have possessed a large number of functions, and we can play game, watch a video, grab lucky money, make flash buying, etc., conveniently in our life. As the UEs are being popularized and widely applied, there is a demand for UEs with higher performance, and particularly a shorter delay in data transmission among the UEs and a $5^{th}$-Generation Node B (gNB).

In the existing LTE system, there is a random access procedure of a UE in a four-step mechanism as illustrated in FIG. 1, where the four-step mechanism includes a msg1 random access preamble, a msg2 random access preamble, msg3 scheduled transmission, and msg4 contention resolution. There is such a long control-plane delay in transmission of an uplink multi-beam Physical Random Access Channel (PRACH) in 5G NR that the performance index of a short delay defined for a URLLC scenario may not be satisfied. As discussed in the standard at present, msg1 is transmitted in such a way that a preamble is transmitted together with data, and as illustrated in FIG. 2, a two-step mechanism includes a msg1 random access preamble plus data, and a msg2 random access preamble, and msg3 and msg4 are omitted as compared with the LTE four-step mechanism, thus shortening in effect a control-plane delay.

However there has been absent so far in the two-step random access mechanism a solution to multiplexing the data among a plurality of users.

SUMMARY

Embodiments of the invention provide a data transmitting method, device, and system so as to multiplex data among a plurality of users in a two-step access mechanism.

In order to attain the object above, an embodiment of the invention provides a data transmitting method applicable to a UE, the method including:

determining, for uplink data transmission of a random access, a data resource corresponding to a preamble in the uplink data transmission according to a correspondence relationship between preambles and data resources, as specified in a protocol, wherein different preambles correspond to different data resources; and transmitting the preamble, and uplink data on the determined data resource.

Furthermore, the data resource includes:

a time resource occupied by data, a frequency resource occupied by data, a DeModulation Reference Signal (DMRS) of data, and a spreading code of data.

Furthermore, if the data resource is a time resource occupied by data, the determining the data resource corresponding to the preamble in the uplink data transmission according to the correspondence relationship between preambles and data resources, specified in the protocol includes:

determining a time resource occupied by data corresponding to the preamble in the uplink data transmission according to a correspondence relationship between preamble groups, and time resources occupied by data, as specified in the protocol, and the preamble in the uplink data transmission, wherein each of the preamble groups includes at least one preamble; and the transmitting the uplink data on determined data resource includes:

transmitting the uplink data carried on determined time resource.

Furthermore, if the data resource is a frequency resource occupied by data, the determining the data resource corresponding to the preamble in the uplink data transmission according to the correspondence relationship between preambles and data resources, as specified in the protocol includes:

determining a frequency resource occupied by data corresponding to the preamble in the uplink data transmission according to a correspondence relationship between preamble groups, and frequency resources occupied by data, as specified in the protocol, and the preamble in the uplink data transmission, wherein each of the preamble groups includes at least one preamble; and the transmitting the uplink data on determined data resource includes:

transmitting the uplink data carried on determined frequency resource.

Furthermore, if the data resource is a DMRS of data, the determining the data resource corresponding to the preamble in the uplink data transmission according to the correspondence relationship, between preambles and data resources, as specified in the protocol includes:

determining a DMRS corresponding to the preamble in the uplink data transmission according to a correspondence relationship between preamble groups, and DMRS's of data, as specified in the protocol, and the preamble in the uplink data transmission, wherein each of the preamble groups includes at least one preamble; and the transmitting the uplink data on determined data resource includes:

transmitting the uplink data encoded and modulated using determined DMRS.

Furthermore, if the data resource is a spreading code of data, the determining the data resource corresponding to the preamble in the uplink data transmission according to the correspondence relationship, between preambles and data resources, as specified in the protocol includes:

determining a spreading code corresponding to the preamble in the uplink data transmission according to a correspondence relationship between preamble groups, and spreading codes of data, as specified in the protocol, and the preamble in the uplink data transmission, wherein each of the preamble groups includes at least one preamble; and the transmitting the uplink data on determined data resource includes:

transmitting the uplink data spread using determined spreading code.

In another aspect, an embodiment of the invention provides a data transmitting method applicable to an eNB including:

receiving a preamble in uplink data transmission, and uplink data; and determining a data resource corresponding to the preamble in the uplink data transmission according to the preamble, and a correspondence relationship between preambles and data resources, as specified in a protocol, and obtaining the uplink data over the data resource, wherein different preambles correspond to different data resources.

Furthermore, the data resource includes:

a time resource occupied by data, a frequency resource occupied by data, a DeModulation Reference Signal (DMRS) of data, and a spreading code of data.

Furthermore, if the data resource is a time resource occupied by data, the determining the data resource corresponding to the preamble in the uplink data transmission according to the preamble, and the correspondence relationship, between preambles and data resources, as specified in the protocol includes:

determining a time resource corresponding to the preamble in the uplink data transmission according to a correspondence relationship between preamble groups, and time resources occupied by data, as specified in the protocol, and the preamble in the uplink data transmission, wherein each of the preamble groups includes at least one preamble.

Furthermore, if the data resource is a frequency resource occupied by data, the determining the data resource corresponding to the preamble in the uplink data transmission according to the preamble, and the correspondence relationship between preambles and data resources, as specified in the protocol includes:

determining a frequency resource occupied by data corresponding to the preamble in the uplink data transmission according to a correspondence relationship between preamble groups, and frequency resources occupied by data, as specified in the protocol, and the preamble in the uplink data transmission, wherein each of the preamble groups includes at least one preamble.

Furthermore, if the data resource is a DMRS of data, the determining the data resource corresponding to the preamble in the uplink data transmission according to the preamble, and the correspondence relationship, between preambles and data resources, as specified in the protocol includes:

determining a DMRS corresponding to the preamble in the uplink data transmission according to a correspondence relationship between preamble groups, and DMRS's of data, as specified in the protocol, and the preamble in the uplink data transmission, wherein each of the preamble groups includes at least one preamble.

Furthermore, if the data resource is a spreading code of data, the determining the data resource corresponding to the preamble in the uplink data transmission according to the preamble, and the correspondence relationship between preambles and data resources, as specified in the protocol includes:

determining a spreading code corresponding to the preamble in the uplink data transmission according to a correspondence relationship between preamble groups, and spreading codes of data, as specified in the protocol, and the preamble in the uplink data transmission, wherein each of the preamble groups includes at least one preamble.

In another aspect, an embodiment of the invention provides a data transmitting device applicable to a UE, the device including:

a determining module configured to determine for uplink data transmission of a random access a data resource corresponding to a preamble in the uplink data transmission according to a correspondence relationship, between preambles and data resources, as specified in a protocol, wherein different preambles correspond to different data resources; and a transmitting module configured to transmit the preamble, and uplink data on determined data resource.

Furthermore, the determining module is configured to determine a time resource occupied by data corresponding to the preamble in the uplink data transmission according to a correspondence relationship between preamble groups, and time resources occupied by data, as specified in the protocol, and the preamble in the uplink data transmission, wherein each of the preamble groups includes at least one preamble; and the transmitting module is configured to transmit the uplink data carried on the determined time resource.

Furthermore, the determining module is configured to determine a frequency resource occupied by data corresponding to the preamble in the uplink data transmission according to a correspondence relationship between preamble groups, and frequency resources occupied by data, as specified in the protocol, and the preamble in the uplink data transmission, wherein each of the preamble groups includes at least one preamble; and the transmitting module is configured to transmit the uplink data carried on determined frequency resource.

Furthermore, the determining module is configured to determine a DMRS corresponding to the preamble in the uplink data transmission according to a correspondence relationship between preamble groups, and DMRS's of data, as specified in the protocol, and the preamble in the uplink data transmission, wherein each of the preamble groups includes at least one preamble; and the transmitting module is configured to transmit the uplink data encoded and modulated using determined DMRS.

Furthermore, the determining module is configured to determine a spreading code corresponding to the preamble in the uplink data transmission according to a correspondence relationship between preamble groups, and spreading codes of data, as specified in the protocol, and the preamble in the uplink data transmission, wherein each of the preamble groups includes at least one preamble; and the transmitting module is configured to transmit the uplink data spread using determined spreading code.

In another aspect, an embodiment of the invention provides a data transmitting device applicable to an eNB, the device including:

a receiving module configured to receive a preamble in uplink data transmission, and uplink data; and a determining and obtaining module configured to determine a data resource corresponding to the preamble in the uplink data transmission according to the preamble, and a correspondence relationship between preambles and data resources, as specified in a protocol, and to obtain the uplink data on the data resource, wherein different preambles correspond to different data resources.

Furthermore, the determining and obtaining module is configured to determine a time resource corresponding to the preamble in the uplink data transmission according to a correspondence relationship between preamble groups, and time resources occupied by data, as specified in the protocol, and the preamble in the uplink data transmission, wherein each of the preamble groups includes at least one preamble.

Furthermore, the determining and obtaining module is configured to determine a frequency resource occupied by data corresponding to the preamble in the uplink data transmission according to a correspondence relationship between preamble groups, and frequency resources occupied by data, as specified in the protocol, and the preamble in the uplink data transmission, wherein each of the preamble groups includes at least one preamble.

Furthermore, the determining and obtaining module is configured to determine a DMRS corresponding to the preamble in the uplink data transmission according to a correspondence relationship between preamble groups, and DMRS's of data, as specified in the protocol, and the preamble in the uplink data transmission, wherein each of the preamble groups includes at least one preamble.

Furthermore, the determining and obtaining module is configured to determine a spreading code corresponding to the preamble in the uplink data transmission according to a correspondence relationship between preamble groups, and spreading codes of data, as specified in the protocol, and the preamble in the uplink data transmission, wherein each of the preamble groups includes at least one preamble.

In still another aspect, an embodiment of the invention provides a data transmitting system including the data transmitting device above applicable to a UE, and the data transmitting device above applicable to n eNB.

The embodiments of the invention provide a data transmitting method, device, and system, and the method includes: determining for uplink data transmission of a random access, a data resource corresponding to a preamble in the uplink data transmission according to a correspondence relationship, between preambles and data resources, specified in a protocol, where different preambles correspond to different data resources; and transmitting the preamble, and uplink data over the determined data resource. In the embodiments of the invention, the correspondence relationship between preambles and data resources is specified in a protocol, and for uplink data transmission of a random access, a data resource corresponding to a preamble in the uplink data transmission can be determined, where different preambles correspond to different data resources, so uplink data of different users can be carried over different data resources to thereby multiplex the data among the users.

BRIEF DESCRIPTION OF THE DRAWINGS

In order to make the technical solutions according to the embodiments of the invention more apparent, the drawings to which reference is to be made in the description of the embodiments will be introduced below in brevity, and apparently the embodiments to be described below are only some embodiments of the invention. Those ordinarily skilled in the art can further derive the other drawings from these drawings without any inventive effort.

DETAILED DESCRIPTION OF THE EMBODIMENTS

Figure 1:
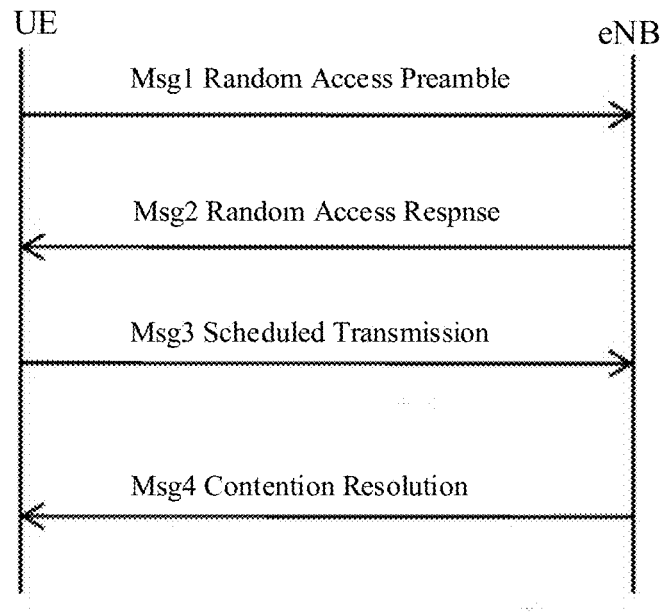
FIG. 1 is a schematic diagram of the four-step random access mechanism in the prior art.
Figure 2:
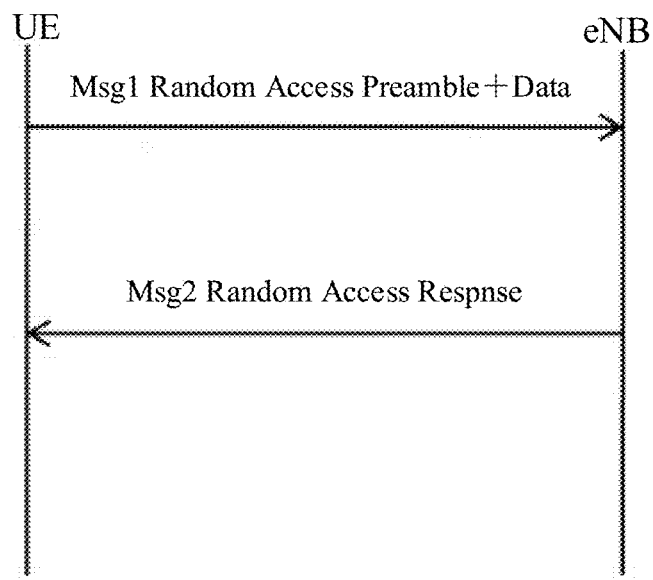
FIG. 2 is a schematic diagram of the two-step random access mechanism in the prior art.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the embodiments of the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Long Term Evolution-Advanced (LTE-A) system, a Universal Mobile Telecommunication System (UMTS), etc.

It shall be further appreciated that in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal, and the remaining components of the access network, where the remaining components of the access network can include an Internet Protocol (IP) network. The base station can further coordinate attribute management on the air interface, and for example, the base station can be a Base Communication module Station (BTS)

in a GSM or CDMA system, or can be a base station (Node B) in a WCDMA system, or can be an evolved base station (Node B or eNB or e-Node B) in an LTE system, although the invention will not be limited thereto.

In order to multiplex data among a plurality of users, the embodiments of the invention provide a data transmitting method, device, and system.

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Figure 3:
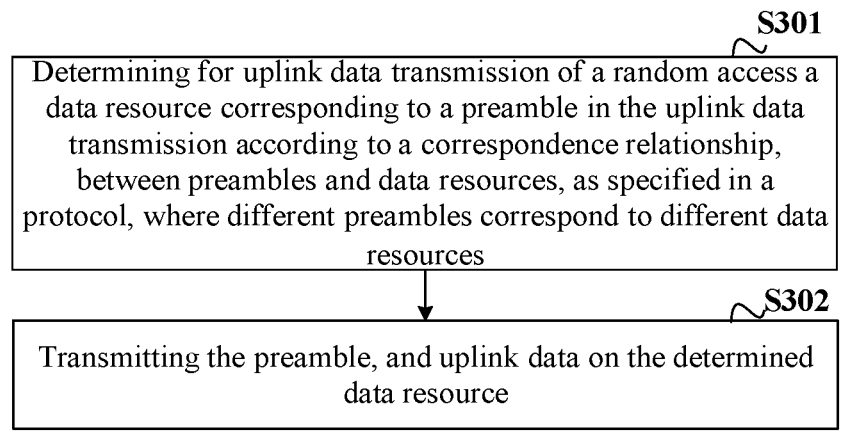
FIG. 3 is a schematic flow chart of a data transmitting method according to an embodiment of the invention.

FIG. 3 is a schematic diagram of a data transmitting method according to an embodiment of the invention, where the method includes the following steps.

The step S301 is to determine, for uplink data transmission of a random access a data resource corresponding to a preamble in the uplink data transmission according to a correspondence relationship, between preambles and data resources, specified in a protocol, where different preambles correspond to different data resources.

The data transmitting method according to the embodiment of the invention is applicable to a UE. For uplink data transmission of a random access, the correspondence relationship between preambles and data resources is specified in the protocol, where different preambles correspond to different data resources. When the preamble in the uplink data transmission is determined, the UE determines the data resource corresponding to the preamble according to the correspondence relationship, between preambles and data resources, specified in the protocol.

The data resource includes:

a time resource occupied by data, a frequency resource occupied by data, a DeModulation Reference Signal (DMRS) of data, and a spreading code of data.

Particularly, in the embodiment of the invention, the data resource can be multiplexed among users in a time division, frequency division, code division, or another multiplexing mode of the resource. Here the data resource includes a time resource occupied by data, a frequency resource occupied by data, a DeModulation Reference Signal (DMRS) of data, and a spreading code of data. If the data resource refers to a time-frequency resource occupied by data, the data resource may be multiplexed among the users in an orthogonal mode of the time-frequency resource, where the orthogonal time-frequency resource may be an orthogonal user resource in the time domain, or an orthogonal user resource in the frequency domain, or both an orthogonal time resource and an orthogonal frequency resource. If the data resource refers to a spreading code, then the data resource may be multiplexed orthogonally among the users using different spreading codes. If the data resource refers to a DMRS of data, there may be different DMRS's of the different users.

The step S302 is to transmit the preamble, and uplink data that uses the determined data resource.

After the data resource corresponding to the preamble in the uplink data transmission, the preamble is transmitted, and the uplink data are carried on the determined data resource.

In the embodiment of the invention, the correspondence relationship between preambles and data resources is specified in the protocol, and for uplink data transmission of a random access, a data resource corresponding to a preamble in the uplink data transmission can be determined, where different preambles correspond to different data resources, so uplink data of different users can be carried on different data resources to thereby multiplex the data among the users.

The following embodiments will be described below for different data resources.

First Embodiment

If the data resource is a time resource occupied by data, in the embodiment of the invention, the determining the data resource corresponding to the preamble in the uplink data transmission according to the correspondence relationship, between preambles and data resources, specified in the protocol will include:

determining a time resource occupied by data corresponding to the preamble in the uplink data transmission according to a correspondence relationship, between preamble groups, and time resources occupied by data, specified in the protocol, and the preamble in the uplink data transmission, where each preamble group includes at least one preamble; and the transmitting the uplink data that uses the determined data resource includes:

transmitting the uplink data carried on the determined time resource.

In the embodiment of the invention, the data resource can be multiplexed among the users in a time division mode of the resource, that is, the data resource refers to a time resource, so the time resource can be multiplexed orthogonally among the users. The users transmit both preambles and data in a msg1 message of a random access, and since the time resources occupied by the data are not scheduled by an eNB, but determined by the UEs themselves, in order to enable the eNB to know the positions of the time resources of the UEs, the correspondence relationship between preamble groups, and time resources occupied by data is specified in the protocol, where there are respective time resources, and each time resource corresponds to a preamble group.

Particularly, time resources occupied by data can be divided into several portions, where a time resource occupied by each data corresponds to a preamble group. In order to transmit uplink data, after the preamble in the uplink data transmission is determined, the time resource occupied by the data corresponding to the preamble in the uplink data transmission can be determined according to the correspondence relationship between preamble groups including preambles, and time resources occupied by data, so that the uplink data can be carried on the time resource to thereby multiplex the resource.

Figure 4:
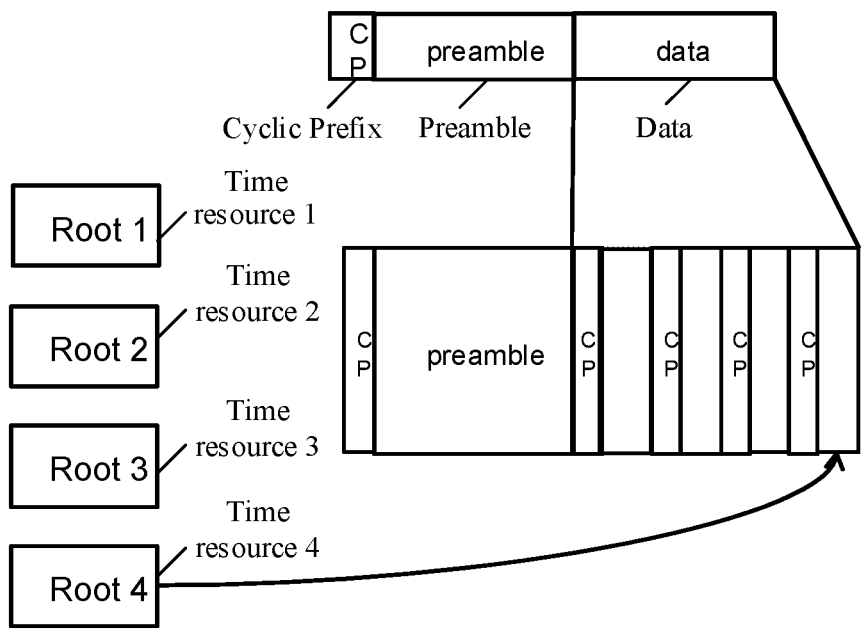
FIG. 4 illustrates an example of a time division multiplexing mode among users according to an embodiment of the invention.

FIG. 4 illustrates an example of a time division multiplexing mode among users, where a data region is divided into four time resources in a TDM mode, that is, time resources occupied by data are divided in to four portions, where each time resource is occupied by a Cyclic Prefix (CP) and data. A correspondence relationship between respective time resources and respective preamble groups is determined so that each time resource corresponds to a different root sequence. Taking the LTE PRACH format as an example, if a cyclic shifting interval is 8, then given a root, there will be 17 (i.e., floor (139/8)) orthogonal sequences of a ZC sequence with the length of 139, and if there are 64 preambles to be generated, then they will be generated using 4 (i.e., 64/17) root sequences, that is, a plurality of root sequences are configured, and each root sequence corresponds to a plurality of orthogonal cyclic shifts.

Taking 64 preambles and 4 time resources as an example, the 64 preambles include a preamble 1, a preamble 2, ..., and a preamble 64 respectively, and the 4 time resources include a time resource 1, a time resource 2, a time resource 3, and a time resource 4 respectively; and as can be specified in the protocol, the preamble 1 to the preamble 16 are a preamble group 1 corresponding to the time resource 1, the preamble 7 to the preamble 32 are a preamble group 2 corresponding to the time resource 2, the preamble 33 to the preamble 48 are a preamble group 3 corresponding to the time resource 3, and the preamble 49 to the preamble 64 are a preamble group 4 corresponding to the time resource 4. Although each group of preamble sequences corresponds to a different time resource, the users can select their preambles from all the preambles in a uniform distribution to thereby in effect lower the probability of collision among the users. Here all the preambles are the 64 preambles. Embodiment of the invention, when a preamble group includes only one preamble, the probability of collision among the users can be lowered in effect.

In the embodiment of the invention, the correspondence relationship between preamble groups, and time resources occupied by data is specified in the protocol, and the time resource occupied by the data corresponding to the preamble in the uplink data transmission is determined according to the preamble in the uplink data transmission, where data corresponding to different preambles occupy different time resources, and the uplink data carried on the determined time resource is transmitted, so the resource can be multiplexed among the users.

Second Embodiment

If the data resource is a frequency resource occupied by data, in the embodiment of the invention, the determining the data resource corresponding to the preamble in the uplink data transmission according to the correspondence relationship, between preambles and data resources, specified in the protocol will include:

determining a frequency resource occupied by data corresponding to the preamble in the uplink data transmission according to a correspondence relationship, between preamble groups, and frequency resources occupied by data, specified in the protocol, and the preamble in the uplink data transmission, where each preamble group includes at least one preamble; and the transmitting the uplink data over the determined data resource includes:

transmitting the uplink data carried on the determined frequency resource.

In the embodiment of the invention, the data resource can be multiplexed among the users in a time division mode of the resource, that is, the data resource refers to a frequency resource, so the frequency resource can be multiplexed orthogonally among the users. The users transmit both preambles and data in a msg1 message of a random access, and since the frequency resources occupied by the data are not scheduled by an eNB, but determined by the UEs themselves, in order to enable the eNB to know the positions of the frequency resources of the UEs, the correspondence relationship between preamble groups, and frequency resources occupied by data is specified in the protocol, where there are respective frequency resources, and each frequency resource corresponds to a preamble group.

Particularly, there may be respective frequency resources occupied by data, where a frequency resource occupied by each data component corresponds to a preamble group. In order to transmit uplink data, after the preamble in the uplink data transmission is determined, the frequency resource occupied by the data corresponding to the preamble in the uplink data transmission can be determined according to the correspondence relationship between preamble groups including preambles, and frequency resources occupied by data, so that the uplink data can be carried over the frequency resource to thereby multiplex the resource.

Figure 5:
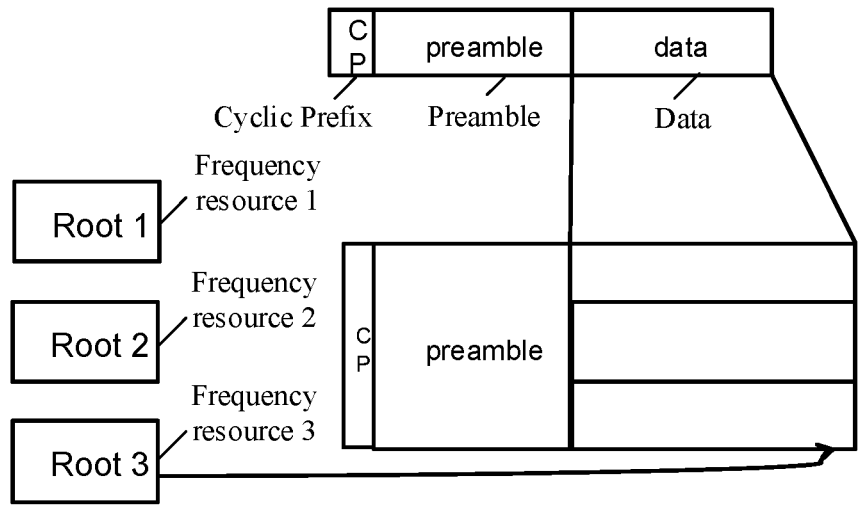
FIG. 5 illustrates an example of a frequency division multiplexing mode among users according to an embodiment of the invention.

For example, there are six Physical Resource Blocks (PRBs) in total, and FIG. 5 illustrates an example of a frequency division multiplexing mode among users, where a data region is divided into three frequency resources in a TDM mode, that is, there are three respective frequency resources occupied by data, where each frequency resource includes two PRBs.

Taking 64 preambles and 3 frequency resources as an example, the 64 preambles include a preamble 1, a preamble 2, ..., and a preamble 64 respectively, and the 3 frequency resources include a frequency resource 1, a frequency resource 2, and a frequency resource 3 respectively; and as can be specified in the protocol, the preamble 1 to the preamble 21 are a preamble group 1 corresponding to the frequency resource 1, the preamble 22 to the preamble 42 are a preamble group 2 corresponding to the frequency resource 3, and the preamble 43 to the preamble 64 are a preamble group 3 corresponding to the frequency resource 3. Although each group of preamble sequences corresponds to a different frequency resource, the users can select their preambles from all the preambles in a uniform distribution to thereby in effect lower the probability of collision among the users. Here all the preambles are the 64 preambles. Embodiment of the invention, when a preamble group includes only one preamble, the probability of collision among the users can be lowered in effect.

In the embodiment of the invention, the correspondence relationship between preamble groups, and frequency resources occupied by data is specified in the protocol, and the frequency resource occupied by the data corresponding to the preamble in the uplink data transmission is determined according to the preamble in the uplink data transmission, where data corresponding to different preambles occupy different frequency resources, and the uplink data carried over the determined frequency resource are transmitted, so the resource can be multiplexed among the users.

Third Embodiment

If the data resource is a DMRS of data, then in the embodiment of the invention, the determining the data resource corresponding to the preamble in the uplink data transmission according to the correspondence relationship, between preambles and data resources, specified in the protocol will include:

determining a DMRS corresponding to the preamble in the uplink data transmission according to a correspondence relationship, between preamble groups, and DMRS's of data, specified in the protocol, and the preamble in the uplink data transmission, where each preamble group includes at least one preamble; and the transmitting the uplink data over the determined data resource includes:

transmitting the uplink data encoded and modulated using the determined DMRS.

In an LTE system, two users may transmit data signals on the same resource, and DMRS's of these two users shall be orthogonal to each other, but there is a low probability that two users transmit on the same resource, so system resources shall be used flexibly in that a resource may be used for only one user, or may be shared among a plurality of users. If data are demodulated using a DMRS, a plurality of orthogonal DMRS's will be supported for a resource in a flexible resource multiplexing mechanism.

Particularly, there may be respective DMRS's, where each DMRS corresponds to a preamble group. In order to transmit uplink data, after the preamble in the uplink data transmission is determined, the DMRS corresponding to the preamble in the uplink data transmission can be determined according to the correspondence relationship between preamble groups including preambles, and DMRS's, so that the uplink data can be encoded and modulated using the DMRS to thereby multiplex the resource.

Each DMRS corresponds respectively to a preamble or a preamble group, where the preamble group includes at least one preamble. Taking an LTE system as an example, there are 12 DMRS's to be cyclically shifted, and if there are six orthogonal DMRS's given a cyclic shifting interval of 2, a DMRS sequence will correspond to approximately 11 (i.e., ceil (64/6)) preambles in the case of 64 preambles.

Taking 64 preambles and 6 DMRS's as an example, the 64 preambles include a preamble 1, a preamble 2, . . . , and a preamble 64 respectively, and the 6 DMRS's include a DMRS 1, a DMRS 2, . . . a DMRS 6, and as can be specified in the protocol, the preamble 1 to the preamble 11 are a preamble group 1 corresponding to the DMRS 1, the preamble 12 to the preamble 22 are a preamble group 2 corresponding to the DMRS 2, . . . , and the preamble 55 to the preamble 64 are a preamble group 6 corresponding to the DMRS 6. Embodiment of the invention, when a preamble group includes only one preamble, the probability of collision among the users can be lowered in effect.

In the embodiment of the invention, the correspondence relationship between preamble groups, and DMRS's of data is specified in the protocol, and the DMRS corresponding to the preamble in the uplink data transmission is determined according to the preamble in the uplink data transmission, where different preambles correspond to different DMRS's, and the uplink data encoded and modulated over the determined DMRS's are transmitted, so the resource can be multiplexed among the users.

Fourth Embodiment

If the data resource is a spreading code of data, then in the embodiment of the invention, the determining the data resource corresponding to the preamble in the uplink data transmission according to the correspondence relationship, between preambles and data resources, specified in the protocol will include:

determining a spreading code corresponding to the preamble in the uplink data transmission according to a correspondence relationship, between preamble groups, and spreading codes of data, specified in the protocol, and the preamble in the uplink data transmission, where each preamble group includes at least one preamble; and the transmitting the uplink data over the determined data resource includes:

transmitting the uplink data spread using the determined spreading code.

In an LTE system, two users may transmit data signals over the same resource, and spreading codes of these two users shall be orthogonal to each other, but there is a low probability that two users transmit over the same resource, so system resources shall be used flexibly in that a resource may be used for only one user, or may be shared among a plurality of users. If data are demodulated using a spreading code, then the resource can be multiplexed flexibly among the users in a code division multiplexing mode.

The users transmit both preambles and data in a msg1 message of a random access, and since the spreading codes of the data are not scheduled by an eNB, but determined by the UEs themselves, in order to enable the eNB to know the positions of the spreading codes of the UEs, the correspondence relationship between preamble groups and spreading codes is specified in the protocol, where a spreading code corresponds to a preamble or a preamble group. After the data are spread, the lengths of payloads of the data shall be less than the lengths of the spread data, and a receiver of the eNB can detect the data through temporal correlation.

Particularly, there may be respective spreading codes, where each spreading code corresponds to a preamble group. In order to transmit uplink data, after the preamble in the uplink data transmission is determined, the spreading code corresponding to the preamble in the uplink data transmission can be determined according to the correspondence relationship between preamble groups including preambles, and spreading codes, so that the uplink data can be spread using the spreading code to thereby multiplex the resource. Embodiment of the invention, when a preamble group includes only one preamble, the probability of collision among the users can be lowered in effect.

In the embodiment of the invention, the correspondence relationship between preamble groups, and spreading codes of data is specified in the protocol, and the spreading code corresponding to the preamble in the uplink data transmission is determined according to the preamble in the uplink data transmission, where different preambles correspond to different spreading codes, and the uplink data spread using the determined spreading code are transmitted, so the resources can be multiplexed among the users.

When the UE determines the data resource corresponding to the preamble in the uplink data transmission according to the correspondence relationship, between preambles and data resources, specified in the protocol, only one kind of data resources, or at least two kinds of data resources among the data resources above may be specified in the protocol, and when there are at least two kinds of data resources, any more than one of the first embodiment to the fourth embodiment above can be combined in practice. For example, if the data resources, corresponding to the preamble in the uplink data transmission, determined according to the correspondence relationship, between preambles and data resources, specified in the protocol include both a time resource and a spreading code, then the uplink data carried over the determined time resource will be transmitted, where the uplink data are spread using the determined spreading code; or if the data resources, corresponding to the preamble in the uplink data transmission, determined according to the correspondence relationship, between preambles and data resources, specified in the protocol include a frequency resource, a DMRS, and a spreading code respectively, then the uplink data carried over the determined frequency resource will be transmitted, where the uplink data are encoded and modulated using the determined DMRS, and spread using the determined spreading code.

Figure 6:
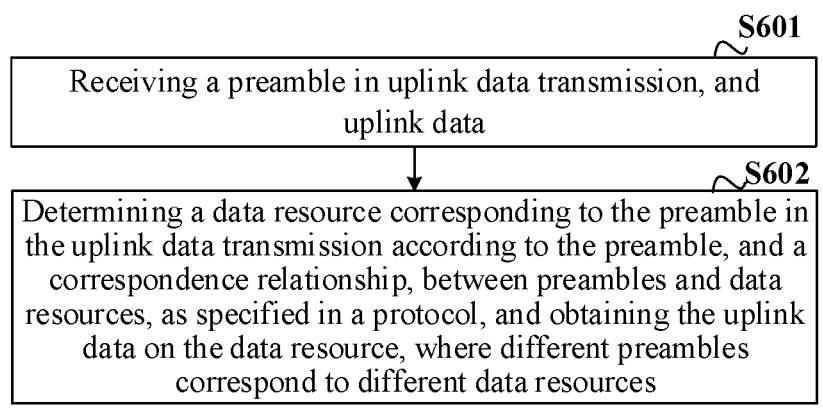
FIG. 6 is a schematic flow chart of a data transmitting method according to an embodiment of the invention.

FIG. 6 is a schematic flow chart of a data transmitting method according to an embodiment of the invention, where the method includes the following steps:

the step S601 is to receive a preamble in uplink data transmission, and uplink data; and the step S602 is to determine a data resource corresponding to the preamble in the uplink data transmission according to the preamble, and a correspondence relationship, between preambles and data resources, specified in a protocol, and to obtain the uplink data using the data resource, where different preambles correspond to different data resources.

The data transmitting method according to the embodiment of the invention is applicable to an eNB. The eNB receives a preamble in uplink data transmission, and uplink data, transmitted by the UE, and the correspondence relationship between preambles and data resources is specified in the protocol, where different preambles correspond to different data resources. The eNB to obtain uplink data determines the data resource corresponding to the preamble in the uplink data transmission according to the correspondence relationship between preambles and data resources upon determining the preamble. The corresponding data resource can be parsed for the uplink data, and the uplink data can be further obtained over the data resource.

The data resource includes:

A time resource occupied by data, a frequency resource occupied by data, a DeModulation Reference Signal (DMRS) of data, and a spreading code of data.

Particularly, in the embodiment of the invention, the data resource can be multiplexed among users in a time division, frequency division, code division, or another multiplexing mode of the resource. Here the data resource includes a time resource occupied by data, a frequency resource occupied by data, a DeModulation Reference Signal (DMRS) of data, and a spreading code of data. If the data resource refers to a time-frequency resource occupied by data, then the data resource may be multiplexed among the users in an orthogonal mode of the time-frequency resource, where the orthogonal time-frequency resource may be an orthogonal user resource in the time domain, or an orthogonal user resource in the frequency domain, or both an orthogonal time resource and an orthogonal frequency resource. If the data resource refers to a spreading code, then the data resource may be multiplexed orthogonally among the users using different spreading codes. If the data resource refers to a DMRS of data, then there may be different DMRS's of the different users.

In the embodiment of the invention, the correspondence relationship between preambles and data resources is specified in the protocol, and a data resource corresponding to a preamble in uplink data transmission can be determined according to the preamble in the uplink data transmission, and the correspondence relationship, between preambles and data resources, specified in the protocol, where different preambles correspond to different data resources, so the eNB can obtain uplink data over different data resources to thereby multiplex the data among the users.

The following embodiments will be described below for different data resources.

Fifth Embodiment

If the data resource is a time resource occupied by data, then in the embodiment of the invention, the determining the data resource corresponding to the preamble in the uplink data transmission according to the preamble, and the correspondence relationship, between preambles and data resources, specified in the protocol will include:

determining a time resource corresponding to the preamble in the uplink data transmission according to a correspondence relationship, between preambles, and time resources occupied by data, specified in the protocol, and the preamble in the uplink data transmission, where each preamble group includes at least one preamble.

In the embodiment of the invention, the data resource can be multiplexed among the users in a time division mode of the resource, that is, the data resource refers to a time resource, so the time resource can be multiplexed orthogonally among the users. The users transmit both preambles and data in a msg1 message of a random access, and since the time resources occupied by the data are not scheduled by the eNB, but determined by the UEs themselves, in order to enable the eNB to know the positions of the time resources of the UEs, the correspondence relationship between preamble groups, and time resources occupied by data is specified in the protocol, where there are respective time resources, and each time resource corresponds to a preamble group.

Particularly, there may be respective time resources occupied by data, where a time resource occupied by each data component corresponds to a preamble group. In order to obtain uplink data, after the preamble in the uplink data transmission, and the uplink data are received, the eNB can determine the time resource occupied by the data corresponding to the preamble in the uplink data transmission according to the correspondence relationship between preamble groups including preambles, and time resources occupied by data, parse the time resource for the uplink data, and obtain the uplink data over the time resource upon a success of parsing to thereby multiplex the resource.

For example, a data region is divided into four time resources in a TDM mode, that is, there are four respective time resources occupied by data, where each time resource is occupied by a Cyclic Prefix (CP) and data. A correspondence relationship between respective time resources and respective preamble groups is determined so that each time resource corresponds to a different root sequence. Taking the LTE PRACH format as an example, if a cyclic shifting interval is 8, then given a root, there will be 17 (i.e., floor (139/8)) orthogonal sequences of a ZC sequence with the length of 139, and if there are 64 preambles to be generated, then they will be generated using 4 (i.e., 64/17) root sequences, that is, a plurality of root sequences are configured, and each root sequence corresponds to a plurality of orthogonal cyclic shifts.

Taking 64 preambles and 4 time resources as an example, the 64 preambles include a preamble 1, a preamble 2, . . . , and a preamble 64 respectively, and the 4 time resources include a time resource 1, a time resource 2, a time resource 3, and a time resource 4 respectively; and as can be specified in the protocol, the preamble 1 to the preamble 16 are a preamble group 1 corresponding to the time resource 1, the preamble 17 to the preamble 32 are a preamble group 2 corresponding to the time resource 2, the preamble 33 to the preamble 48 are a preamble group 3 corresponding to the time resource 3, and the preamble 49 to the preamble 64 are a preamble group 4 corresponding to the time resource 4. After the time resource occupied by the data corresponding to the preamble in the uplink data transmission is determined, the eNB can parse the time resource for the uplink data, and obtain the uplink data over the time resource upon a success of parsing. Embodiment of the invention, when a preamble group includes only one preamble, the probability of collision among the users can be lowered in effect.

In the embodiment of the invention, the correspondence relationship between preamble groups, and time resources occupied by data is specified in the protocol, and the time resource corresponding to the preamble in the uplink data transmission can be determined according to the preamble in the uplink data transmission, and the correspondence relationship, between preamble groups, and time resources occupied by data, specified in the protocol, where different preambles correspond to different time resources, the corresponding time resource can be parsed for the uplink data, and the uplink data can be further obtained over the time resource, so the resource can be multiplexed among the users.

Sixth Embodiment

If the data resource is a frequency resource occupied by data, in the embodiment of the invention, the determining the data resource corresponding to the preamble in the uplink data transmission according to the preamble, and the correspondence relationship, between preambles and data resources, specified in the protocol will include:

determining a frequency resource occupied by data corresponding to the preamble in the uplink data transmission according to a correspondence relationship, between preamble groups, and frequency resources occupied by data, specified in the protocol, and the preamble in the uplink data transmission, where each preamble group includes at least one preamble.

In the embodiment of the invention, the data resource can be multiplexed among the users in a time division mode of the resource, that is, the data resource refer to a frequency resource, so the frequency resource can be multiplexed orthogonally among the users. The users transmit both preambles and data in a msg1 message of a random access, and since the frequency resources occupied by the data are not scheduled by the eNB, but determined by the UEs themselves, in order to enable the eNB to know the positions of the frequency resources of the UEs, the correspondence relationship between preamble groups, and frequency resources occupied by data is specified in the protocol, where there are respective frequency resources, and each frequency resource corresponds to a preamble group.

Particularly, there may be respective frequency resources occupied by data, where a frequency resource occupied by each data component corresponds to a preamble group. In order to obtain uplink data, after the preamble in the uplink data transmission, and the uplink data are received, the eNB can determine the frequency resource occupied by the data corresponding to the preamble in the uplink data transmission according to the correspondence relationship between preamble groups including preambles, and frequency resources occupied by data, parse the frequency resource for the uplink data, and obtain the uplink data over the frequency resource upon a success of parsing to thereby multiplex the resource.

For example, there are six PRBs in total, and a data region is divided into three frequency resources in a TDM mode, that is, there are three respective frequency resources occupied by data, where each frequency resource includes two PRBs.

Taking 64 preambles and 3 frequency resources as an example, the 64 preambles include a preamble 1, a preamble 2, ..., and a preamble 64 respectively, and the 3 frequency resources include a frequency resource 1, a frequency resource 2, and a frequency resource 3 respectively; and as can be specified in the protocol, the preamble 1 to the preamble 21 are a preamble group 1 corresponding to the frequency resource 1, the preamble 22 to the preamble 42 are a preamble group 2 corresponding to the frequency resource 3, and the preamble 43 to the preamble 64 are a preamble group 3 corresponding to the frequency resource 3. After the frequency resource occupied by the data corresponding to the preamble in the uplink data transmission is determined, the eNB can parse the frequency resource for the uplink data, and obtain the uplink data using the frequency resource upon a success of parsing. Embodiment of the invention, when a preamble group includes only one preamble, the probability of collision among the users can be lowered in effect.

In the embodiment of the invention, the correspondence relationship between preamble groups, and frequency resources occupied by data is specified in the protocol, and the frequency resource corresponding to the preamble in the uplink data transmission can be determined according to the preamble in the uplink data transmission, and the correspondence relationship, between preamble groups, and frequency resources occupied by data, specified in the protocol, where different preambles correspond to different frequency resources, the corresponding frequency resource can be parsed for the uplink data, and the uplink data can be further obtained using the frequency resource, so the resource can be multiplexed among the users.

Seventh Embodiment

If the data resource is a DMRS of data, then in the embodiment of the invention, the determining the data resource corresponding to the preamble in the uplink data transmission according to the preamble, and the correspondence relationship, between preambles and data resources, specified in the protocol will include:

determining a DMRS corresponding to the preamble in the uplink data transmission according to a correspondence relationship, between preamble groups, and DMRS's of data, specified in the protocol, and the preamble in the uplink data transmission, where each preamble group includes at least one preamble.

In an LTE system, two users may transmit data signals over the same resource, and DMRS's of these two users shall be orthogonal to each other, but there is a low probability that two users transmit over the same resource, so system resources shall be used flexibly in that a resource may be used for only one user, or may be shared among a plurality of users. If data are demodulated using a DMRS, then a plurality of orthogonal DMRS's will be supported for a resource in a flexible resource multiplexing mechanism.

Particularly, there may be respective DMRS's, where each DMRS corresponds to a preamble group. In order to obtain uplink data, after the preamble in the uplink data transmission, and the uplink data are received, the eNB can determine the DMRS corresponding to the preamble in the uplink data transmission according to the correspondence relationship between preamble groups including preambles, and DMRS's, parse the DMRS for the uplink data, and obtain the uplink data using the DMRS upon a success of parsing to thereby multiplex the resource.

Each DMRS corresponds respectively to a preamble or a preamble group, where the preamble group includes at least one preamble. Taking an LTE system as an example, there are 12 DMRS's to be cyclically shifted, and if there are six orthogonal DMRS's given a cyclic shifting interval of 2, a DMRS sequence will correspond to approximately 11 (i.e., ceil (64/6)) preambles in the case of 64 preambles.

Taking 64 preambles and 6 DMRS's as an example, the 64 preambles include a preamble 1, a preamble 2, . . . , and a preamble 64 respectively, and the 6 DMRS's include a DMRS 1, a DMRS 2, . . . , and a DMRS 6 respectively; and as can be specified in the protocol, the preamble 1 to the preamble 11 are a preamble group 1 corresponding to the DMRS 1, the preamble 12 to the preamble 22 are a preamble group 2 corresponding to the DMRS 2, . . . , and the preamble 55 to the preamble 64 are a preamble group 6 corresponding to the DMRS 6. After the DMRS corresponding to the preamble in the uplink data transmission is determined, the eNB can parse the DMRS for the uplink data, and obtain the uplink data using the DMRS upon a success of parsing.

If two users select preambles in the same preamble group, then these two users will select the same DMRS, thus resulting in collision between the DMRS's of these two users. The eNB can address the collision problem through related detection and demodulation using the preamble, or through detection using a sophisticated receiver. Embodiment of the invention, when a preamble group includes only one preamble, the probability of collision among the users can be lowered in effect.

In the embodiment of the invention, the correspondence relationship between preamble groups, and DMRS's of data is specified in the protocol, and the DMRS corresponding to the preamble in the uplink data transmission is determined according to the preamble in the uplink data transmission, where different preambles correspond to different DMRS's, the corresponding DMRS can be parsed for the uplink data, and the uplink data can be further obtained using the DMRS, so the resource can be multiplexed among the users.

Eighth Embodiment

If the data resource is a spreading code of data, in the embodiment of the invention, the determining the data resource corresponding to the preamble in the uplink data transmission according to the preamble, and the correspondence relationship, between preambles and data resources, specified in the protocol will include:

determining a spreading code corresponding to the preamble in the uplink data transmission according to a correspondence relationship, between preamble groups, and spreading codes of data, specified in the protocol, and the preamble in the uplink data transmission, where each preamble group includes at least one preamble.

In an LTE system, two users may transmit data signals over the same resource, but there is a low probability that two users transmit over the same resource, so system resources shall be used flexibly in that a resource may be used for only one user, or may be shared among a plurality of users. The resource can be multiplexed flexibly among the users in a code division multiplexing mode.

The users transmit both preambles and data in a msg1 message of a random access, and since the spreading codes of the data are not scheduled by the eNB, but determined by the UEs themselves, in order to enable the eNB to know the positions of the spreading codes of the UEs, the correspondence relationship between preamble groups and spreading codes is specified in the protocol, where a spreading code corresponds to a preamble or a preamble group. After the data are spread, the lengths of payloads of the data shall be less than the lengths of the spread data, and a receiver of the eNB can detect the data through temporal correlation.

Particularly, there may be respective spreading codes, where each spreading code corresponds to a preamble group.

In order to obtain uplink data, after the preamble in the uplink data transmission is determined, the eNB can determine the spreading code corresponding to the preamble in the uplink data transmission according to the correspondence relationship between preamble groups including preambles, and spreading codes, parse the spreading code for the uplink data, and obtain the uplink data using the spreading code upon a success of parsing to thereby multiplex the resource. Embodiment of the invention, when a preamble group includes only one preamble, the probability of collision among the users can be lowered in effect.

After the spreading code corresponding to the preamble in the uplink data transmission is determined, the eNB parses the spreading code for the uplink data, and obtains the uplink data using the spreading code upon a success of parsing.

In the embodiment of the invention, the correspondence relationship between preamble groups, and spreading codes of data is specified in the protocol, and the spreading code corresponding to the preamble in the uplink data transmission is determined according to the preamble in the uplink data transmission, where different preambles correspond to different spreading code, the corresponding spreading code can be parsed for the uplink data, and the uplink data can be further obtained using the spreading code, so the resource can be multiplexed among the users.

When the eNB determines the data resource corresponding to the preamble in the uplink data transmission according to the correspondence relationship, between preambles and data resources, specified in the protocol, only one kind of data resources, or at least two kinds of data resources among the data resources above may be specified in the protocol, and when there are at least two kinds of data resources, any more than one of the fifth embodiment to the eighth embodiment above can be combined in practice. For example, if the data resources, corresponding to the preamble in the uplink data transmission, determined according to the correspondence relationship, between preambles and data resources, specified in the protocol include both a time resource and a spreading code, then the uplink data will be obtained over the determined time resource, where the uplink data are de-spread using the determined spreading code; or if the data resources, corresponding to the preamble in the uplink data transmission, determined according to the correspondence relationship, between preambles and data resources, specified in the protocol include a frequency resource, a DMRS, and a spreading code respectively, then the uplink data will be obtained over the determined frequency resource, where the uplink data are decoded and demodulated using the determined DMRS, and de-spread using the determined spreading code.

Figure 7:
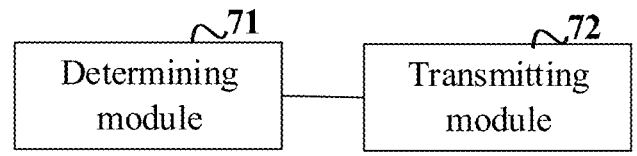
FIG. 7 is a schematic structural diagram of a data transmitting device according to an embodiment of the invention.

FIG. 7 is a schematic structural diagram of a data transmitting device according to an embodiment of the invention, applicable to a UE, where the device includes:

a determining module 71 configured to determine for uplink data transmission of a random access a data resource corresponding to a preamble in the uplink data transmission according to a correspondence relationship, between preambles and data resources, specified in a protocol, where different preambles correspond to different data resources; and a transmitting module 72 configured to transmit the preamble, and uplink data using the determined data resource.

The determining module 71 is configured to determine a time resource occupied by data corresponding to the preamble in the uplink data transmission according to a correspondence relationship, between preamble groups, and time resources occupied by data, specified in the protocol, and the preamble in the uplink data transmission, where each preamble group includes at least one preamble.

The transmitting module 72 is configured to transmit the uplink data carried on the determined time resource.

The determining module 71 is configured to determine a frequency resource occupied by data corresponding to the preamble in the uplink data transmission according to a correspondence relationship, between preamble groups, and frequency resources occupied by data, specified in the protocol, and the preamble in the uplink data transmission, where each preamble group includes at least one preamble.

The transmitting module 72 is configured to transmit the uplink data carried on the determined frequency resource.

The determining module 71 is configured to determine a DMRS corresponding to the preamble in the uplink data transmission according to a correspondence relationship, between preamble groups, and DMRS's of data, specified in the protocol, and the preamble in the uplink data transmission, where each preamble group includes at least one preamble.

The transmitting module 72 is configured to transmit the uplink data encoded and modulated using the determined DMRS.

The determining module 71 is configured to determine a spreading code corresponding to the preamble in the uplink data transmission according to a correspondence relationship, between preamble groups, and spreading codes of data, specified in the protocol, and the preamble in the uplink data transmission, where each preamble group includes at least one preamble.

The transmitting module 72 is configured to transmit the uplink data spread using the determined spreading code.

Figure 8:
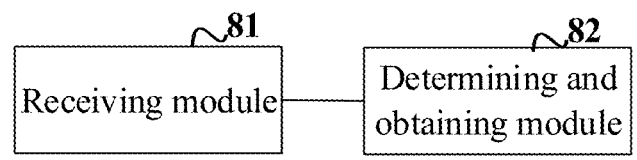
FIG. 8 is a schematic structural diagram of another data transmitting device according to another embodiment of the invention.

FIG. 8 is a schematic structural diagram of a data transmitting device according to an embodiment of the invention, applicable to an eNB, where the device includes:

a receiving module 81 configured to receive a preamble in uplink data transmission, and uplink data; and a determining and obtaining module 82 configured to determine a data resource corresponding to the preamble in the uplink data transmission according to the preamble, and a correspondence relationship, between preambles and data resources, specified in a protocol, and to obtain the uplink data over the data resource, where different preambles correspond to different data resources.

The determining and obtaining module 82 is configured to determine a time resource corresponding to the preamble in the uplink data transmission according to a correspondence relationship, between preambles, and time resources occupied by data, specified in the protocol, and the preamble in the uplink data transmission, where each preamble group includes at least one preamble.

The determining and obtaining module 82 is configured to determine a frequency resource occupied by data corresponding to the preamble in the uplink data transmission according to a correspondence relationship, between preamble groups, and frequency resources occupied by data, specified in the protocol, and the preamble in the uplink data transmission, where each preamble group includes at least one preamble.

The determining and obtaining module 82 is configured to determine a DMRS corresponding to the preamble in the uplink data transmission according to a correspondence relationship, between preamble groups, and DMRS's of data, specified in the protocol, and the preamble in the uplink data transmission, where each preamble group includes at least one preamble.

The determining and obtaining module 82 is configured to determine a spreading code corresponding to the preamble in the uplink data transmission according to a correspondence relationship, between preamble groups, and spreading codes of data, specified in the protocol, and the preamble in the uplink data transmission, where each preamble group includes at least one preamble.

Figure 9:
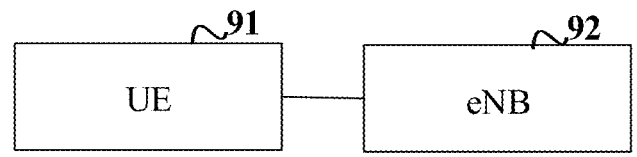
FIG. 9 is a schematic structural diagram of a data transmitting system according to an embodiment of the invention.

FIG. 9 is a schematic structural diagram of a data transmitting system according to an embodiment of the invention, where the data transmitting system includes the data transmitting device above applicable to a UE 91, and the data transmitting device above applicable to an eNB 92.

Figure 10:
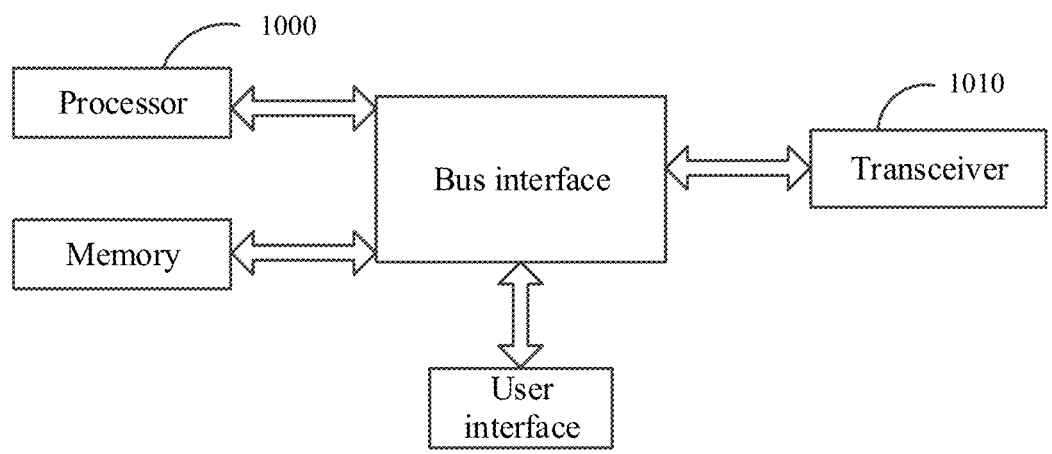
FIG. 10 is a schematic physical structural diagram of a data transmitting device according to another embodiment of the invention.

Based upon the same inventive idea, as illustrated in FIG. 10, an embodiment of the invention provides a UE including at least a processor 1000 and a transceiver 1010.

The processor 1000 is configured to read and execute program in a memory:

to determine for uplink data transmission of a random access a data resource corresponding to a preamble in the uplink data transmission according to a correspondence relationship, between preambles and data resources, specified in a protocol, where different preambles correspond to different data resources; and to transmit the preamble, and uplink data over the determined data resource through the transceiver 1010.

The transceiver 1010 is configured to receive and transmit data under the control of the processor 1000.

Optionally the data resource includes:

a time resource occupied by data, a frequency resource occupied by data, a DeModulation Reference Signal (DMRS) of data, and a spreading code of data.

If the data resource is a time resource occupied by data, the processor 1000 configured to determine the data resource corresponding to the preamble in the uplink data transmission according to the correspondence relationship, between preambles and data resources, specified in the protocol is configured:

to determine a time resource occupied by data corresponding to the preamble in the uplink data transmission according to a correspondence relationship, between preamble groups, and time resources occupied by data, specified in the protocol, and the preamble in the uplink data transmission, where each preamble group includes at least one preamble; and the processor 1000 is configured to transmit the uplink data over the determined data resource through the transceiver 1010 by:

transmitting the uplink data carried on the determined time resource.

Optionally, if the data resource is a frequency resource occupied by data, then the processor 1000 configured to determine the data resource corresponding to the preamble in the uplink data transmission according to the correspondence relationship, between preambles and data resources, specified in the protocol is configured:

to determine a frequency resource occupied by data corresponding to the preamble in the uplink data transmission according to a correspondence relationship, between preamble groups, and frequency resources occupied by data, specified in the protocol, and the preamble in the uplink data transmission, where each preamble group includes at least one preamble; and the processor 1000 is configured to transmit the uplink data over the determined data resource through the transceiver 1010 by:

transmitting the uplink data carried on the determined frequency resource.

Optionally, if the data resource is a DMRS of data, then the processor 1000 configured to determine the data resource corresponding to the preamble in the uplink data transmission according to the correspondence relationship, between preambles and data resources, specified in the protocol is configured:

to determine a DMRS corresponding to the preamble in the uplink data transmission according to a correspondence relationship, between preamble groups, and DMRS's of data, specified in the protocol, and the preamble in the uplink data transmission, where each preamble group includes at least one preamble; and the processor 1000 is configured to transmit the uplink data over the determined data resource through the transceiver 1010 by:

transmitting the uplink data encoded and modulated using the determined DMRS.

Optionally, if the data resource is a spreading code of data, then the processor 1000 configured to transmit the uplink data over the determined data resource through the transceiver 1010 is configured:

to determine a spreading code corresponding to the preamble in the uplink data transmission according to a correspondence relationship, between preamble groups, and spreading codes of data, specified in the protocol, and the preamble in the uplink data transmission, where each preamble group includes at least one preamble; and the processor 1000 is configured to transmit the uplink data over the determined data resource through the transceiver 1010 by:

transmitting the uplink data spread using the determined spreading code.

Here in FIG. 10, the bus architecture can include any number of interconnecting buses and bridges to particularly link together various circuits including one or more processors represented by the processor 1000, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver 1010 can be a number of elements, e.g., a transmitter and a receiver, which are units for communication with various other devices over a transmission medium. The processor 1000 is responsible for managing the bus architecture and performing normal processes, and the memory can store data for use by the processor 1000 in performing the operations.

Figure 11:
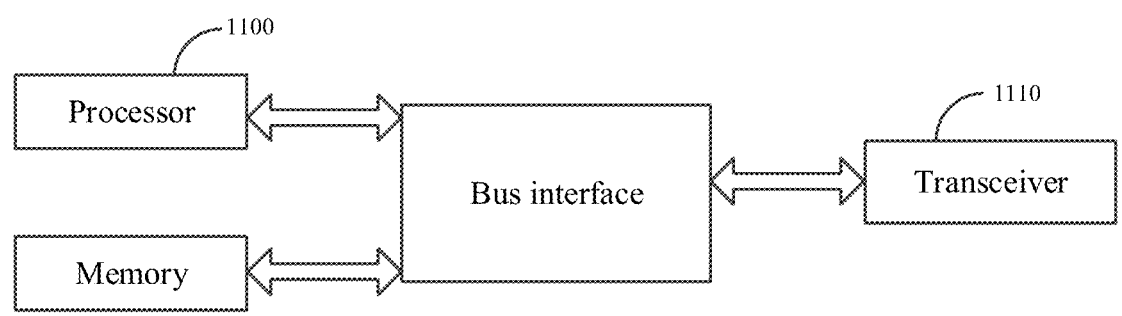
FIG. 11 is a schematic physical structural diagram of another data transmitting device according to another embodiment of the invention.

Based upon the same inventive idea, as illustrated in FIG. 11, an embodiment of the invention provides a UE including at least a processor 1100 and a transceiver 1110, where:

the processor 1100 is configured to read and execute program in a memory:

to receive a preamble in uplink data transmission, and uplink data through the transceiver 1110; and to determine a data resource corresponding to the preamble in the uplink data transmission according to the preamble, and a correspondence relationship, between preambles and data resources, specified in a protocol, and to obtain the uplink data over the data resource, where different preambles correspond to different data resources.

The transceiver 1110 is configured to receive and transmit data under the control of the processor 1100.

Optionally the data resource includes:

a time resource occupied by data, a frequency resource occupied by data, a DeModulation Reference Signal (DMRS) of data, and a spreading code of data.

If the data resource is a time resource occupied by data, the processor 1100 is configured to determine the data resource corresponding to the preamble in the uplink data transmission according to the preamble, and the correspondence relationship, between preambles and data resources, specified in the protocol by:

determining a time resource corresponding to the preamble in the uplink data transmission according to a correspondence relationship, between preambles, and time resources occupied by data, specified in the protocol, and the preamble in the uplink data transmission, where each preamble group includes at least one preamble.

Optionally, if the data resource is a frequency resource occupied by data, the processor 1100 is configured to determine the data resource corresponding to the preamble in the uplink data transmission according to the preamble, and the correspondence relationship, between preambles and data resources, specified in the protocol by:

determining a frequency resource occupied by data corresponding to the preamble in the uplink data transmission according to a correspondence relationship, between preamble groups, and frequency resources occupied by data, specified in the protocol, and the preamble in the uplink data transmission, where each preamble group includes at least one preamble.

Optionally, if the data resource is a DMRS of data, the processor 1100 is configured to determine the data resource corresponding to the preamble in the uplink data transmission according to the preamble, and the correspondence relationship, between preambles and data resources, specified in the protocol by:

determining a DMRS corresponding to the preamble in the uplink data transmission according to a correspondence relationship, between preamble groups, and DMRS's of data, specified in the protocol, and the preamble in the uplink data transmission, where each preamble group includes at least one preamble.

Optionally, if the data resource is a spreading code of data, then the processor 1100 is configured to determine the data resource corresponding to the preamble in the uplink data transmission according to the preamble, and the correspondence relationship, between preambles and data resources, specified in the protocol by:

determining a spreading code corresponding to the preamble in the uplink data transmission according to a correspondence relationship, between preamble groups, and spreading codes of data, specified in the protocol, and the preamble in the uplink data transmission, where each preamble group includes at least one preamble.

Here in FIG. 11, the bus architecture can include any number of interconnecting buses and bridges to particularly link together various circuits including one or more processors represented by the processor 1100, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver 1110 can be a number of elements, e.g., a transmitter and a receiver, which are units for communication with various other devices over a transmission medium. The processor 1100 is responsible for managing the bus architecture and performing normal processes, and the memory can store data for use by the processor 1100 in performing the operations.

The embodiments of the invention provide a data transmitting method, device, and system, and the method includes: determining for uplink data transmission of a random access a data resource corresponding to a preamble in the uplink data transmission according to a correspondence relationship, between preambles and data resources, specified in a protocol, where different preambles correspond to different data resources; and transmitting the preamble, and uplink data over the determined data resource. In the embodiments of the invention, the correspondence relationship between preambles and data resources is specified in a protocol, and for uplink data transmission of a random access, a data resource corresponding to a preamble in the uplink data transmission can be determined, where different preambles correspond to different data resources, so uplink data of different users can be carried over different data resources to thereby multiplex the data among the users.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A data transmitting method, applicable to a UE, the method comprising:
   determining, for a uplink data transmission of a random access, a data resource corresponding to a preamble in the uplink data transmission according to a correspondence relationship between preambles and data resources as specified in a protocol, wherein different preambles correspond to different data resources; and
   transmitting the preamble, and uplink data on determined data resource;
   wherein the data resource comprises:
   a time resource occupied by data, a frequency resource occupied by data, a DeModulation Reference Signal (DMRS) of data, and a spreading code of data;
   wherein if the data resource is the DMRS of data, the determining the data resource corresponding to the preamble in the uplink data transmission according to the correspondence relationship between preambles and data resources, as specified in the protocol comprises:
   determining the DMRS corresponding to the preamble in the uplink data transmission according to a correspondence relationship between preamble groups, and DMRS's of data, as specified in the protocol, and the preamble in the uplink data transmission, wherein each of the preamble groups comprises at least one preamble; and
   the transmitting the uplink data on the determined data resource comprises:
   transmitting the uplink data encoded and modulated using determined DMRS;
   if the data resource is the spreading code of data, the determining the data resource corresponding to the preamble in the uplink data transmission according to the correspondence relationship between preambles and data resources, as specified in the protocol comprises:
   determining the spreading code corresponding to the preamble in the uplink data transmission according to a correspondence relationship between preamble groups, and spreading codes of data, as specified in the protocol, and the preamble in the uplink data transmission, wherein each of the preamble groups comprises at least one preamble; and
   the transmitting the uplink data on the determined data resource comprises:
   transmitting the uplink data spread using determined spreading code.

2. The method according to claim 1, wherein if the data resource is the time resource occupied by data, the determining the data resource corresponding to the preamble in the uplink data transmission according to the correspondence relationship between preambles and data resources, as specified in the protocol comprises:
   determining the time resource occupied by data corresponding to the preamble in the uplink data transmission according to a correspondence relationship between preamble groups, and time resources occupied by data, as specified in the protocol, and the preamble in the uplink data transmission, wherein each of the preamble groups comprises at least one preamble; and the transmitting the uplink data on the determined data resource comprises:

transmitting the uplink data carried on the determined time resource.

3. The method according to claim 1, wherein if the data resource is the frequency resource occupied by data, the determining the data resource corresponding to the preamble in the uplink data transmission according to the correspondence relationship between preambles and data resources, as specified in the protocol comprises:

determining the frequency resource occupied by data corresponding to the preamble in the uplink data transmission according to a correspondence relationship between preamble groups, and frequency resources occupied by data, as specified in the protocol, and the preamble in the uplink data transmission, wherein each of the preamble groups comprises at least one preamble; and the transmitting the uplink data on the determined data resource comprises:

transmitting the uplink data carried on the determined frequency resource.

4. A data transmitting method, applicable to an eNB, the method comprising:

receiving a preamble in uplink data transmission, and uplink data; and determining a data resource corresponding to the preamble in the uplink data transmission according to the preamble, and a correspondence relationship between preambles and data resources, as specified in a protocol, and obtaining the uplink data using the data resource, wherein different preambles correspond to different data resources;

wherein the data resource comprises:

a time resource occupied by data, a frequency resource occupied by data, a DeModulation Reference Signal (DMRS) of data, and a spreading code of data;

wherein if the data resource is the DMRS of data, the determining the data resource corresponding to the preamble in the uplink data transmission according to the preamble, and the correspondence relationship between preambles and data resources, specified in the protocol includes:

determining the DMRS corresponding to the preamble in the uplink data transmission according to a correspondence relationship between preamble groups, and DMRS's of data, as specified in the protocol, and the preamble in the uplink data transmission, wherein each of the preamble groups comprises at least one preamble;

if the data resource is the spreading code of data, the determining the data resource corresponding to the preamble in the uplink data transmission according to the preamble, and the correspondence relationship between preambles and data resources, as specified in the protocol includes:

determining the spreading code corresponding to the preamble in the uplink data transmission according to a correspondence relationship between preamble groups, and spreading codes of data, as specified in the protocol, and the preamble in the uplink data transmission, wherein each of the preamble groups comprises at least one preamble.

5. The method according to claim 4, wherein if the data resource is the time resource occupied by data, the determining the data resource corresponding to the preamble in the uplink data transmission according to the preamble, and the correspondence relationship between preambles and data resources, as specified in the protocol includes:

determining the time resource corresponding to the preamble in the uplink data transmission according to a correspondence relationship between preamble groups, and time resources occupied by data, as specified in the protocol, and the preamble in the uplink data transmission, wherein each of the preamble groups comprises at least one preamble.

6. The method according to claim 4, wherein if the data resource is the frequency resource occupied by data, the determining the data resource corresponding to the preamble in the uplink data transmission according to the preamble, and the correspondence relationship between preambles and data resources, as specified in the protocol includes:

determining the frequency resource occupied by data corresponding to the preamble in the uplink data transmission according to a correspondence relationship, between preamble groups, and frequency resources occupied by data, as specified in the protocol, and the preamble in the uplink data transmission, wherein each of the preamble groups comprises at least one preamble.

7. A data transmitting device, applicable to a UE, the data transmitting device comprising: a memory configured to store a computer readable program, and a processor configured to read the memory to execute the computer readable program to:

to determine, for uplink data transmission of a random access, a data resource corresponding to a preamble in the uplink data transmission according to a correspondence relationship between preambles and data resources, as specified in a protocol, wherein different preambles correspond to different data resources; and to transmit the preamble, and uplink data using determined data resource;

wherein the data resource comprises:

a time resource occupied by data, a frequency resource occupied by data, a DeModulation Reference Signal (DMRS) of data, and a spreading code of data;

wherein the processor is configured to read the memory to execute the computer readable program to determine the DMRS corresponding to the preamble in the uplink data transmission according to a correspondence relationship between preamble groups, and DMRS's of data, as specified in the protocol, and the preamble in the uplink data transmission, wherein each of the preamble groups comprises at least one preamble; and transmit the uplink data encoded and modulated using determined DMRS.

8. The device according to claim 7, wherein the processor is configured to read the memory to execute the computer readable program to determine the time resource occupied by data corresponding to the preamble in the uplink data transmission according to a correspondence relationship between preamble groups, and time resources occupied by data, as specified in the protocol, and the preamble in the uplink data transmission, wherein each of the preamble groups comprises at least one preamble; and transmit the uplink data carried on determined time resource.

9. The device according to claim 7, wherein the processor is configured to read the memory to execute the computer readable program to determine the frequency resource occupied by data corresponding to the preamble in the uplink data transmission according to a correspondence relationship between preamble groups, and frequency resources occupied by data, as specified in the protocol, and the preamble in the uplink data transmission, wherein each of the preamble groups comprises at least one preamble; and transmit the uplink data carried on determined frequency resource.

10. The device according to claim 7, wherein the processor is configured to read the memory to execute the computer readable program to determine the spreading code corresponding to the preamble in the uplink data transmission according to a correspondence relationship between preamble groups, and spreading codes of data, as specified in the protocol, and the preamble in the uplink data transmission, wherein each of the preamble groups comprises at least one preamble; and transmit the uplink data spread using determined spreading code.

11. A data transmitting device, applicable to an eNB, the data transmitting device comprising: a memory configured to store a computer readable program, and a processor configured to read the memory to execute the computer readable program to:

receive a preamble in uplink data transmission, and uplink data; and determine a data resource corresponding to the preamble in the uplink data transmission according to the preamble, and a correspondence relationship between preambles and data resources, as specified in a protocol, and to obtain the uplink data using the data resource, wherein different preambles correspond to different data resources;

wherein the data resource comprises:

a time resource occupied by data, a frequency resource occupied by data, a DeModulation Reference Signal (DMRS) of data, and a spreading code of data;

wherein the processor is configured to read the memory to execute the computer readable program to determine the DMRS corresponding to the preamble in the uplink data transmission according to a correspondence relationship between preamble groups, and DMRS's of data, as specified in the protocol, and the preamble in the uplink data transmission, wherein each of the preamble groups comprises at least one preamble.

12. The device according to claim 11, wherein the processor is configured to read the memory to execute the computer readable program to determine the time resource corresponding to the preamble in the uplink data transmission according to a correspondence relationship between preamble groups, and time resources occupied by data, as specified in the protocol, and the preamble in the uplink data transmission, wherein each of the preamble groups comprises at least one preamble.

13. The device according to claim 11, wherein the processor is configured to read the memory to execute the computer readable program to determine the frequency resource occupied by data corresponding to the preamble in the uplink data transmission according to a correspondence relationship between preamble groups, and frequency resources occupied by data, as specified in the protocol, and the preamble in the uplink data transmission, wherein each of the preamble groups comprises at least one preamble.

14. The device according to claim 11, wherein the processor is configured to read the memory to execute the computer readable program to determine the spreading code corresponding to the preamble in the uplink data transmission according to a correspondence relationship between preamble groups, and spreading codes of data, as specified in the protocol, and the preamble in the uplink data transmission, wherein each of the preamble groups comprises at least one preamble.

* * * * *